June 1, 1926. 1,586,737
H. D. GEYER
METHOD OF MAKING MOLDED RUBBER HANDWHEELS
Filed Feb. 18, 1925 4 Sheets-Sheet 1
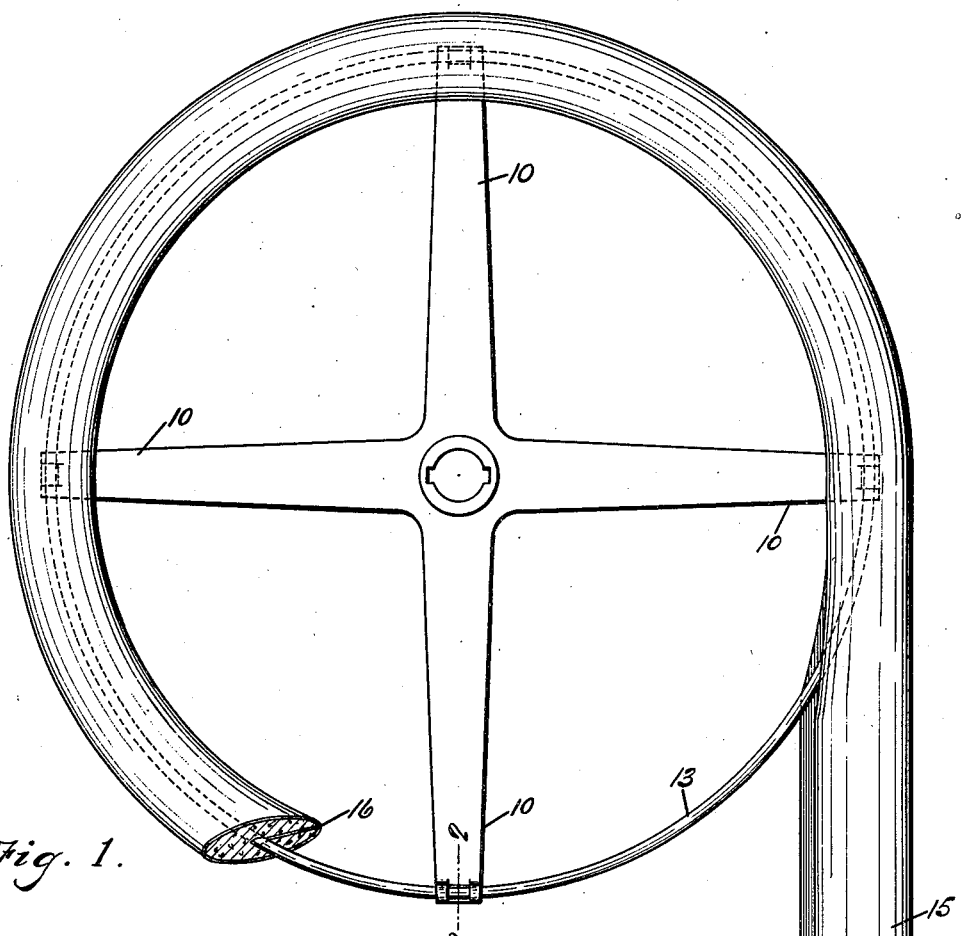
Fig. 1.
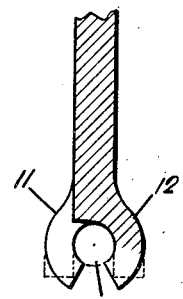
Fig. 2.
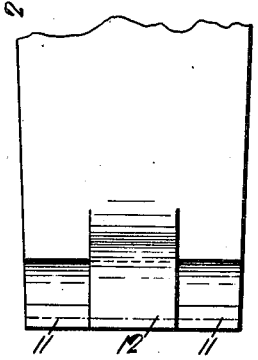
Fig. 3.
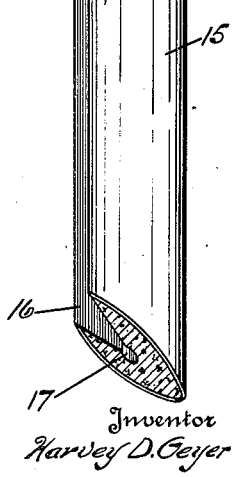
Inventor
Harvey D. Geyer
By Spencer Sewall & Hardman
his Attorneys June 1, 1926.

H. D. GEYER 1,586,737

METHOD OF MAKING MOLDED RUBBER HANDWHEELS

Filed Feb. 18, 1925     4 Sheets-Sheet 2

Inventor
Harvey D. Geyer

By Spencer Sewall H Hardman
his Attorneys

June 1, 1926.

H. D. GEYER 1,586,737

METHOD OF MAKING MOLDED RUBBER HANDWHEELS

Filed Feb. 18, 1925    4 Sheets-Sheet 3

Inventor
Harvey D. Geyer

By Spencer Sewall & Hardman
his Attorneys

June 1, 1926.

H. D. GEYER 1,586,737

METHOD OF MAKING MOLDED RUBBER HANDWHEELS

Filed Feb. 18, 1925 4 Sheets-Sheet 4

Inventor
Harvey D. Geyer

By Spencer Sewall Hardman
his Attorneys

Patented June 1, 1926.

1,586,737

UNITED STATES PATENT OFFICE.

HARVEY D. GEYER, OF DAYTON, OHIO, ASSIGNOR TO THE INLAND MANUFACTURING COMPANY, OF DAYTON, OHIO, A CORPORATION OF DELAWARE.

METHOD OF MAKING MOLDED-RUBBER HANDWHEELS.

Application filed February 18, 1925. Serial No. 10,153.

This invention relates to improvements in molded rubber handwheel rims, or similar articles, and to improved methods for making the same.

An object of this invention is to provide an improved method of making a reinforced rubber annulus whereby a better article is produced and economies of manufacture effected.

Heretofore reinforced rims have been made by inserting a flexible reinforcing element in the unvulcanized rim material before the same has been shaped in the form of a ring, the flexibility of the reinforcing element permitting the easy bending of the rim material to the desired ring form. This invention, however, contemplates providing a preformed ring-shaped reinforcing element which is sufficiently rigid to be self-sustaining and to provide sufficient support for the unvulcanized rim material after it is laid thereon to hold the same in substantially ring form until it is laid within the vulcanizing mold. Preferably this reinforcing element is a steel wire hoop, having the joint therein welded, whereby sufficient rigidity for the above mentioned purposes is obtained and in addition a yieldability is obtained to give greatly increased strength of the finished rim under shock. Another advantage of this method of laying the rubber material on a ready formed ring-shaped reinforcing element lies in the fact that the spider arms may be easily secured directly to the reinforcing element before the rubber is laid thereon and a much stronger finished wheel thus obtained.

Another object of this invention is to provide a method of extruding a flexible length of unvulcanized rubber, suitable for making rims by the above method, by cutting a continuous slit therein during extrusion.

Another object is to provide an improved method of laying on a rubber core stock a casing of rubber of a higher grade or different color from that of the core stock.

Another object is to provide an improved method of molding a rim having corrugations or indentations therein by vulcanizing a rim of uniform section in a die mold under a high internal pressure.

Further objects and advantages of the present invention will be apparent from the following description, reference being had to the accompanying drawings, wherein a preferred form of embodiment of the present invention is clearly shown.

In the drawings:—

Fig. 1 is a view showing the method of this invention of applying a slitted length of unvulcanized rubber upon a preformed reinforcing element having the wheel spider previously secured thereto.

Fig. 2 is a section on line 2—2 of Fig. 1 and shows in dotted lines the lugs on the end of the spider arm before being clinched around the reinforcing hoop.

Fig. 3 is a plan view of the outer end of a spider arm before the reinforcing hoop is secured thereto.

In the drawings similar reference characters refer to similar parts throughout the several views.

Figure 4:
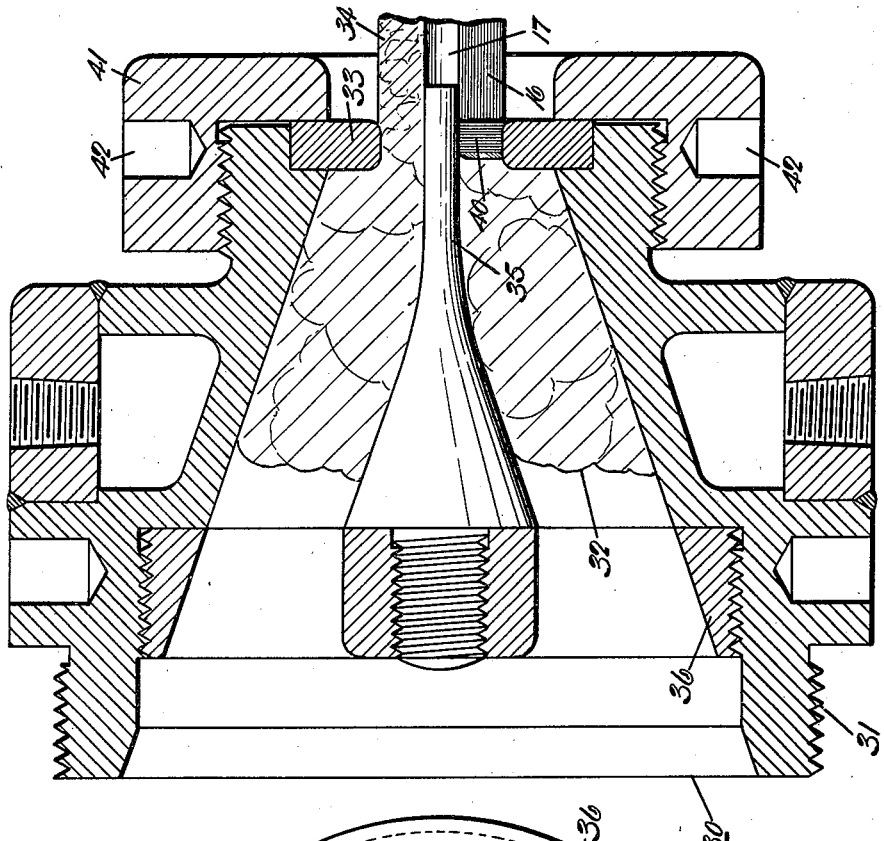
Fig. 4 is a section through an improved extruding head for a conventional rubber extruding machine.

The dimensions of the wheel shown are such as to be suitable for an automobile steering wheel.

In Fig. 1 numeral 10 designates the arms of the handwheel spider which may be of any desired design or construction. In the particular form chosen for illustration of this invention the spider is cast of metal which is sufficiently malleable to permit the lugs 11 and 12 on the outer end of each arm 10 to be clinched around the reinforcing hoop 13, as most clearly illustrated in Fig. 2. These lugs 11 and 12 are preferably staggered as clearly shown in Fig. 3 in order to avoid the necessity of providing a core in casting the same. It is obvious from Figs. 2 and 3 that the spider may be made in a permanent mold or die-casting machine without the use of a core lying between the lugs 11 and 12.

The reinforcing hoop 13 is preferably made from $\frac{3}{16}$ inch steel wire having its ends welded together, whereby a quite rigid and self-sustaining ring is formed which, nevertheless, yields sufficiently to absorb shocks without danger of breaking. This hoop 13 may be easily distorted sufficiently to place it between the lugs 11 and 12 on the spider arms after which the lugs are clinched over it, as shown in full lines in Fig. 2.

A length of unvulcanized rubber stock 15 having a continuous slit 16 cut therein to a substantial depth is now laid around the hoop 13 as clearly shown in Fig. 1. The hoop 13 is received within the slit 16 and the rubber pressed firmly around the hoop so that it adheres thereto and is thus held firmly in place in ring form so that the wheel unit may be readily handled, without danger of the rubber coming off, until it is placed in the vulcanizing mold. Preferably the rim stock 15 is provided at the bottom of the slit 16 with a longitudinal aperture 17 of the approximate section of the hoop 13. This aperture 17 facilitates the proper positioning of the rim stock upon the hoop 13 and permits the edges of the slit 16 to more easily come together, as will be readily obvious from viewing Fig. 1. The ends of the rim stock 15 are preferably cut at a bias, as shown, and the ends abutted and pressed firmly together so that a perfect joint is made during vulcanization. The wheel unit is next placed in a suitable curing mold and the rubber vulcanized at a suitable temperature and for the required length of time. During vulcanization the edges of slit 16 are vulcanized together to form an integral structure and the rubber flows up tightly against the inserted ends of arms 10 and is vulcanized thereto.

It is of course obvious that the above described method of making the reinforced rubber rim can be used in cases where the spider is not first attached to the reinforcing hoop 13. In such cases, if desired, the slit 16 may be turned in other positions than on the inner periphery of the rim since there would then be no spider arms to be inserted in said slit.

Figure 5:
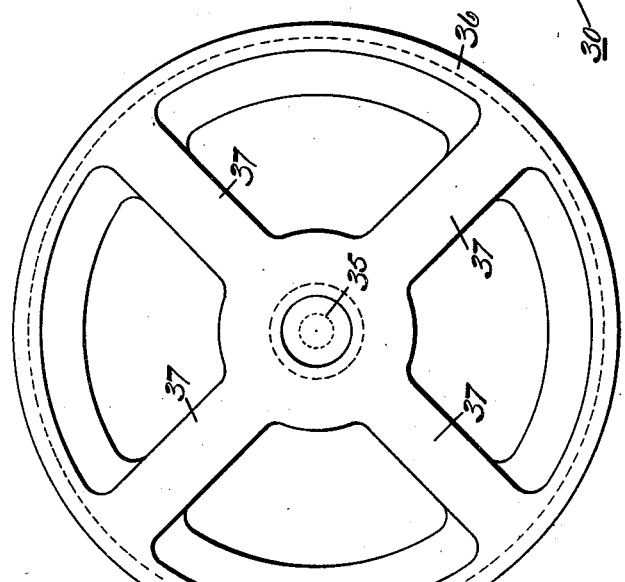
Fig. 5 is a detail of a part of the extruding head of Fig. 4.
Figure 6:
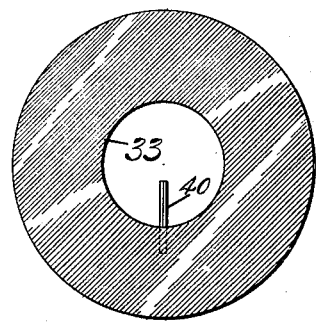
Figs. 6 and 7 are face and sectional detail views respectively of a die member used in the extruding head of Fig. 4.
Figure 7:
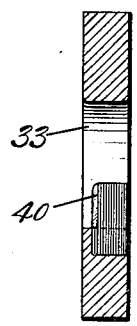

In Fig. 4 there is illustrated a method of forming the unvulcanized rim stock used in the above mentioned method of rim manufacture. Numeral 30 designates an extruding head which is attached to the outlet of a conventional rubber extruding machine by means of the screw threads 31. Numeral 32 designates the rubber mix which is being squeezed by the extruding screw of the conventional extruding machine through the forming die 33 thus forming the rim stock 34 in continuous length. The relatively small longitudinal aperture 17 in the rim stock is formed during extrusion by the die core member 35 which is supported substantially at the center of die 33 by the spider-shaped support 36 screw threaded into the head 30 as clearly shown in Fig. 4. The elevational view of the support 36 shown in Fig. 5 clearly shows the open spaces between the spider-arms 37 of support 36 through which the rubber mix passes as it is forced under high pressure from the extruding screw to the die 33. The die 33 is also provided with a relatively thin radially extending blade 40 which is rigidly fixed thereto (see Figs. 6 and 7). This blade 40 extends from the inner periphery of the forming die 33 into substantial contact with the core die 35. It is obvious that this blade 40 will make a continuous slit 16 in the rim stock 34 extending to the aperture 17 as the rim stock is extruded through the die 33 by the pressure of the extruding screw (not shown). Of course if it is desired to make the slit 16 by some other means after the extrusion operation the blade 40 is omitted from the die 33. Preferably a set of dies (corresponding to die 33) of the various shapes and sizes which may be desired for different wheel rims are provided, and with or without a blade 40 as desired. It is an easy matter to replace the die 33 with the desired die simply by removing the retaining ring 41 from the die head by applying a large spanner wrench thereto at the recesses 42.

The rim stock 34 formed in the extruding head 30 may be used directly for making a rim as shown in Fig. 1, but preferably a low grade rubber mix with suitable wood or other fiber filling is extruded through head 30 and the extruded material covered with an outer casing of higher grade rubber. If desired this outer casing of rubber may be of calendered sheet cut to proper width and length and rolled on the outside of suitable lengths of the extruded core stock extruded through the head 30. However in Fig. 8 there is illustrated a method of extruding the outer casing directly upon the core stock in continuous length. The extruding head 50 is attached to the outlet of a conventional rubber extruding machine by means of the screw threads 51. Numeral 52 designates the rubber mix which is to form the outer casing 53 and which is squeezed by the extruding screw (not shown) through the forming die 54. The core stock 34 is guided axially through the die 54 by means of the guide member 55 which is provided with a tapered end 56 terminating at the neck of die 54, as clearly illustrated in Fig. 8. A number of bolts 57 arranged around the member 56 and bearing thereagainst permit the adjustment of guide member 55 to accurate alignment with the die 54. The jacket 58 is provided for the circulation of steam or cooling water as desired to keep the rubber mix 52 at the proper temperature during extrusion for best results.

Figure 8:
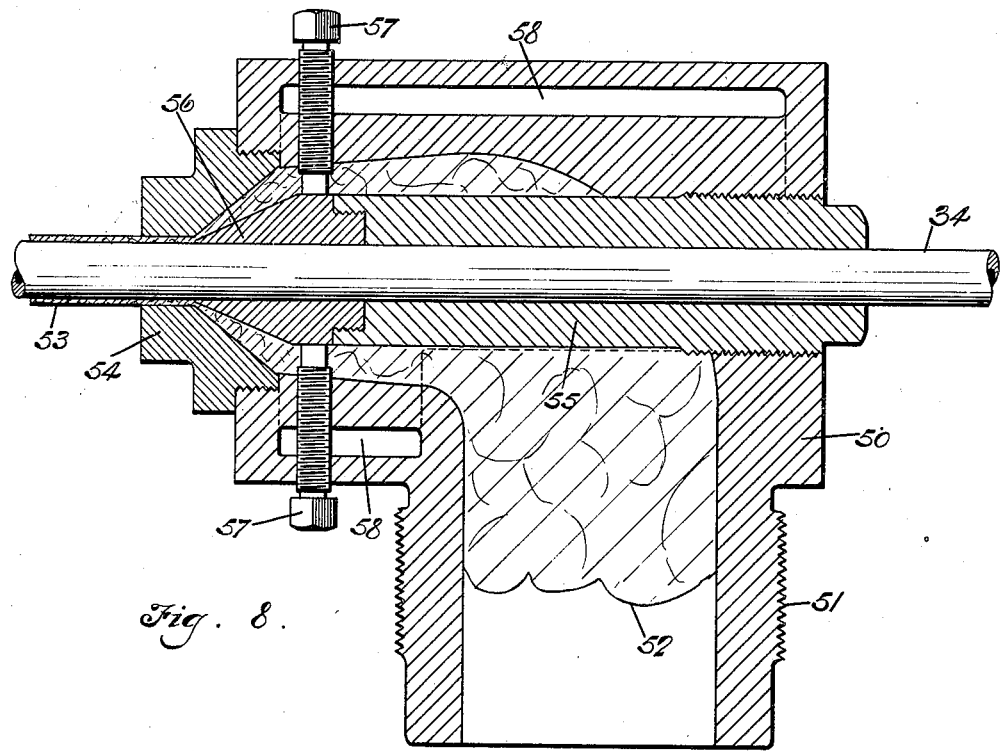
Fig. 8 is a sectional view illustrating the improved method of extruding a rubber casing upon a rubber core stock for making handwheel rims.

When an outer casing of rubber is laid over a core stock 34, either by hand or by the extruding head shown in Fig. 8, the casing is later slit to register with the slit 16 in the core stock 34. Or, if desired, the core stock 34 may first be covered with the outer casing and then the core and casing be slit to the proper depth at one operation. The rim stock 15 shown in Fig. 1 comprises a core stock of rubber and fiber mixture having an outer casing of higher grade rubber to give a hard well appearing outer surface to the finished rim.

Figure 9:
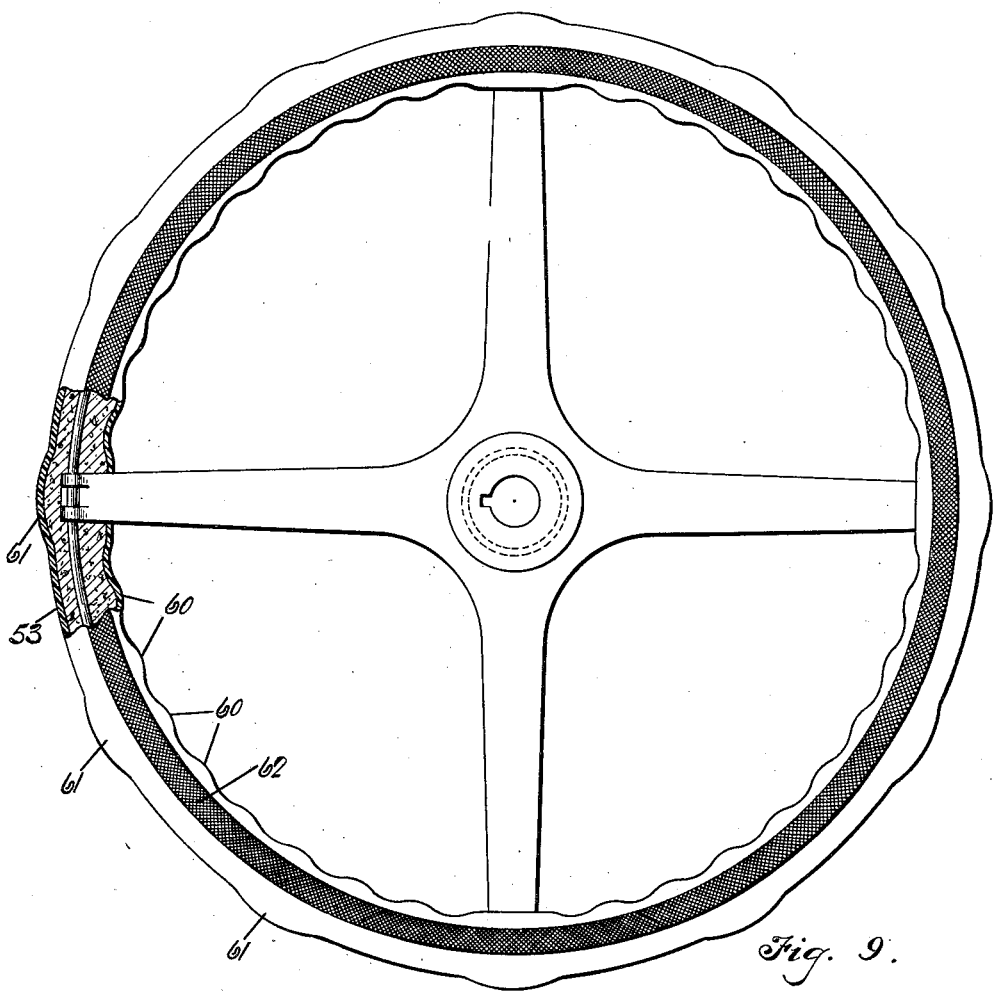
Fig. 9 is a plan view of a handwheel built according to this invention and adapted for use as an automobile steering wheel. The sectional portion illustrates how the outer rubber casing of higher grade or colored rubber follows the corrugations of the rim without change in the substantially uniform thickness of said outer casing.
Figure 10:
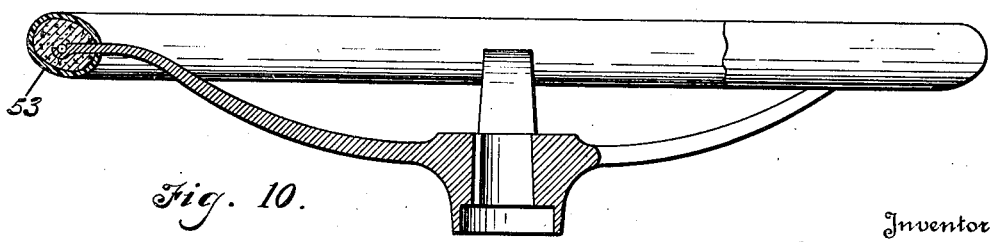
Fig. 10 is a sectional view of the handwheel of Fig. 9.

The finished wheel is illustrated in Figs. 9 and 10. The unvulcanized rim of substantially uniform section, as shown in Fig. 1, is placed in a curing die having cavities therein to form the rim corrugations 60 and 61 and the knurled portion 62 (see Fig. 9). A sufficient amount of rubber blower, such for instance as ammonium carbonate, is compounded with the rubber of the rim, preferably only in the core stock, as to cause the rubber to swell during vulcanization and completely fill the mold under high pressure, whereby the outer casing 53 is pressed within the die cavities with enormous pressure. By this means the small projections of the knurled portion 62 are clear cut and well defined in the finished rim. A proportion of one and one-half per cent of ammonium carbonate in the rubber mix has been found to give good results with the wheel shown in Fig. 9, but of course the proper proportion for any particular design of wheel or composition of the rubber mix may be easily determined in any given case by trial.

While the form of embodiment of the present invention as herein disclosed, constitutes a preferred form of embodiment of the present invention, it is to be understood that other forms might be adopted, all coming within the scope of the claims which follow.

What is claimed is as follows:—

1. The method of manufacturing a reinforced rubber hand-wheel rim comprising: forming a flexible length of unvulcanized rubber stock of substantially circular cross section and having a longitudinal slit therein, laying said stock around the outside of a reinforcing self-sustaining hoop so that the hoop is received within said slit, said slit thus lying on the inner periphery of the ring thus formed, and vulcanizing the rubber in a mold whereby the edges of said slit are vulcanized together.

2. The method of manufacturing a reinforced rubber ring comprising: forming a flexible length of unvulcanized rubber stock of preformed cross section and having a relatively small longitudinal aperture therein and a continuous slit extending laterally to said aperture, laying said stock upon a reinforcing self-sustaining hoop so that the hoop is received within said aperture, and vulcanizing the reinforced rubber ring thus formed in a mold whereby the edges of said slit are vulcanized together.

3. The method of manufacturing a reinforced rubber handwheel comprising: forming a flexible length of unvulcanized rubber stock having a longitudinal slit therein, laying said stock upon a preformed self-sustaining reinforcing ring having spider arms secured thereto so that the ring and the outer ends of the spider arms are received within said slit, and vulcanizing in a mold the rim of the wheel thus formed whereby the rubber is made to flow during vulcanization and completely close up against the inserted ends of the spider arms.

4. The method of manufacturing a reinforced rubber handwheel comprising: forming a flexible length of unvulcanized rubber stock having a relatively small longitudinal aperture therein and a continuous slit extending laterally to said aperture, laying said stock upon a preformed reinforcing ring having spider arms secured thereto so that said ring is received within said aperture and the outer ends of the spider arms within said slit, and vulcanizing in a mold the rim of the wheel thus formed whereby the rubber is made to flow during vulcanization and completely close up against the inserted ends of the spider arms.

5. The steps in the method of manufacturing a continuous length of unvulcanized rubber stock, suitable for making handwheel rims, comprising: preforming a continuous length of core stock having a longitudinal slit therein suitable for the reception of a reinforcing member, then passing said core stock axially through a second die of larger dimension and simultaneously extruding through said second die a rubber casing upon said core stock, and then making a slit in the rubber casing in registration with the slit in the core stock.

6. The method of manufacturing a handwheel rim having corrugations therein comprising: forming a flexible length of unvulcanized rubber core stock compounded with a suitable blowing agent and of substantially uniform section, covering said core stock with an unvulcanized rubber casing of a different grade or color from that of the core stock, forming a rim from said covered stock, placing said rim in a mould having the desired corrugation cavities therein, and then vulcanizing the rim under high internal pressure developed by said blowing agent causing the rubber to completely fill the corrugation cavities in the mold.

In testimony whereof I hereunto affix my signature.

HARVEY D. GEYER.